United States Patent
Mason et al.

(10) Patent No.: US 6,418,489 B1
(45) Date of Patent: Jul. 9, 2002

(54) DIRECT MEMORY ACCESS CONTROLLER AND METHOD THEREFOR

(75) Inventors: Kristen L. Mason; Gary R. Morrison; Jeffrey M. Polega; Donald L. Tietjen, all of Austin; Frank C. Galloway, Dripping Springs; Charles Edward Nuckolls, Austin; Jennifer L. McKeown, Austin; Robert Bradford Cohen, Austin, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/488,368

(22) Filed: Jan. 18, 2000

Related U.S. Application Data

(63) Continuation-in-part of application No. 09/426,009, filed on Oct. 25, 1999.

(51) Int. Cl.[7] ................................................ G06F 13/28
(52) U.S. Cl. ........................ 710/22; 710/54; 710/266; 711/100; 711/105; 711/169
(58) Field of Search ............................. 710/1, 4, 7, 22, 710/23, 26, 27, 48, 54, 112, 266; 711/100, 105, 101, 104, 108, 111–114, 169

(56) References Cited

U.S. PATENT DOCUMENTS

| | | | | |
|---|---|---|---|---|
| 4,135,242 A | * | 1/1979 | Ward et al. | 364/200 |
| 4,545,014 A | * | 10/1985 | Oguchi | 364/200 |
| 4,872,111 A | * | 10/1989 | Daberkow et al. | 364/200 |
| 5,890,012 A | * | 3/1999 | Poisner | 710/22 |
| 5,944,800 A | * | 8/1999 | Mattheis et al. | 710/23 |
| 6,012,109 A | * | 1/2000 | Schultz | 710/56 |
| 6,035,367 A | * | 3/2000 | Laws | 711/100 |

* cited by examiner

*Primary Examiner*—Jeffrey Gaffin
*Assistant Examiner*—Rijue R. Mai

(57) ABSTRACT

Direct memory access controller (DMA) (2) adapted to directly execute C language style FOR tasks, where the FOR task includes a movement of a data element from a first location to a second location in memory, and the movement is controlled by a master DMA engine (MDE) (6). A master DMA engine (MDE) (6) includes a top level state machine (52) to coordinate a context save state machine (54), a parse state machine (56), and a running state machine (58). An loop control descriptor (LCD) queue (74) and a data routing descriptor (DRD) cache store information. The LCD queue allows pipelining of descriptor parsing, while the DRD cache avoids refetching of DRDs on reentry of loops.

18 Claims, 4 Drawing Sheets

DIRECT MEMORY ACCESS CONTROLLER AND METHOD THEREFOR

RELATED APPLICATIONS

This is a continuation-in-part (CIP) of U.S. patent application Ser. No. 09/426,009 by Gary Morrison, et al., having Attorney Docket Number SC10880TH, filed on Oct. 25, 1999 and assigned to the assignee hereof.

FIELD OF THE INVENTION

The present invention relates to direct memory access in a data processing system, and specifically to controlling direct memory access using a user-programmable algorithm.

BACKGROUND OF THE INVENTION

Direct Memory Access (DMA) controllers are used in computer systems to offload repetitive data movement tasks from a processor in a data processing system. As the demand for increased performance of the processor, or central processing unit (CPU), increases so does the need for high-throughput, flexible DMAs that work well with these processors. Original DMA controllers (DMACs) used only registers or memory storage devices to specify source, destination, and length of data to be transferred. The DMAC was coupled to only one source device. Soon the need to carry out simultaneous block transfers led to the development of multi-channel DMACs that achieved the effect of performing several data movements simultaneously. As data transfer rates continued to increase, set up, service and interrupt overhead for the DMACs became too high, especially when the DMAC was programmed for a single contiguous block of memory per interrupt.

To overcome these overhead issues, descriptor-based DMACs were introduced. As the computer system complexity increased, so the DMACs increased in complexity. Today, some DMACs use a dedicated processor to perform such complex functions. The dedicated processor, or coprocessor, is often based on a reduced instruction set computer (RISC) methodology. Such coprocessors operate on increasingly complex protocols, and often provide algorithmic support, such as digital filtering operations. The algorithmic support is critical to many applications where data movement and calculation rates are high. This is particularly true of entertainment applications, such as video, graphic and audio applications, and is also important in areas such as audio and visual decompression calculations. While the need for flexible algorithmic manipulation of data by the DMAC increases, the coprocessor becomes less attractive as it operates on a data-structure descriptor architecture which has limited flexibility and it can not achieve the high performance of the dedicated state machine of a traditional DMAC.

When a process in a DMA controller (DMAC) is interrupted, it is expedient and often necessary to save information relating to the current process to allow the process to continue after the interruption is resolved. This information is referred to as the "context." Registers, stacks, and arrays are allocated for context storing. The information stored may be rather large, including address, control and status information. This introduces delays to the operation of the DMA for storing the information and later retrieving the information. Additionally, storage space requirements may become quite large impacting the size of the DMAC.

Therefore, there is a need for a method to control a DMAC that allows algorithmic support using descriptors that define DMA algorithms instead of data structures, which provides an efficient context storing mechanism. There is further a need for a DMAC that has a variety of functions and thereby increase the efficiency and performance of a DMA.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

Figure 1:
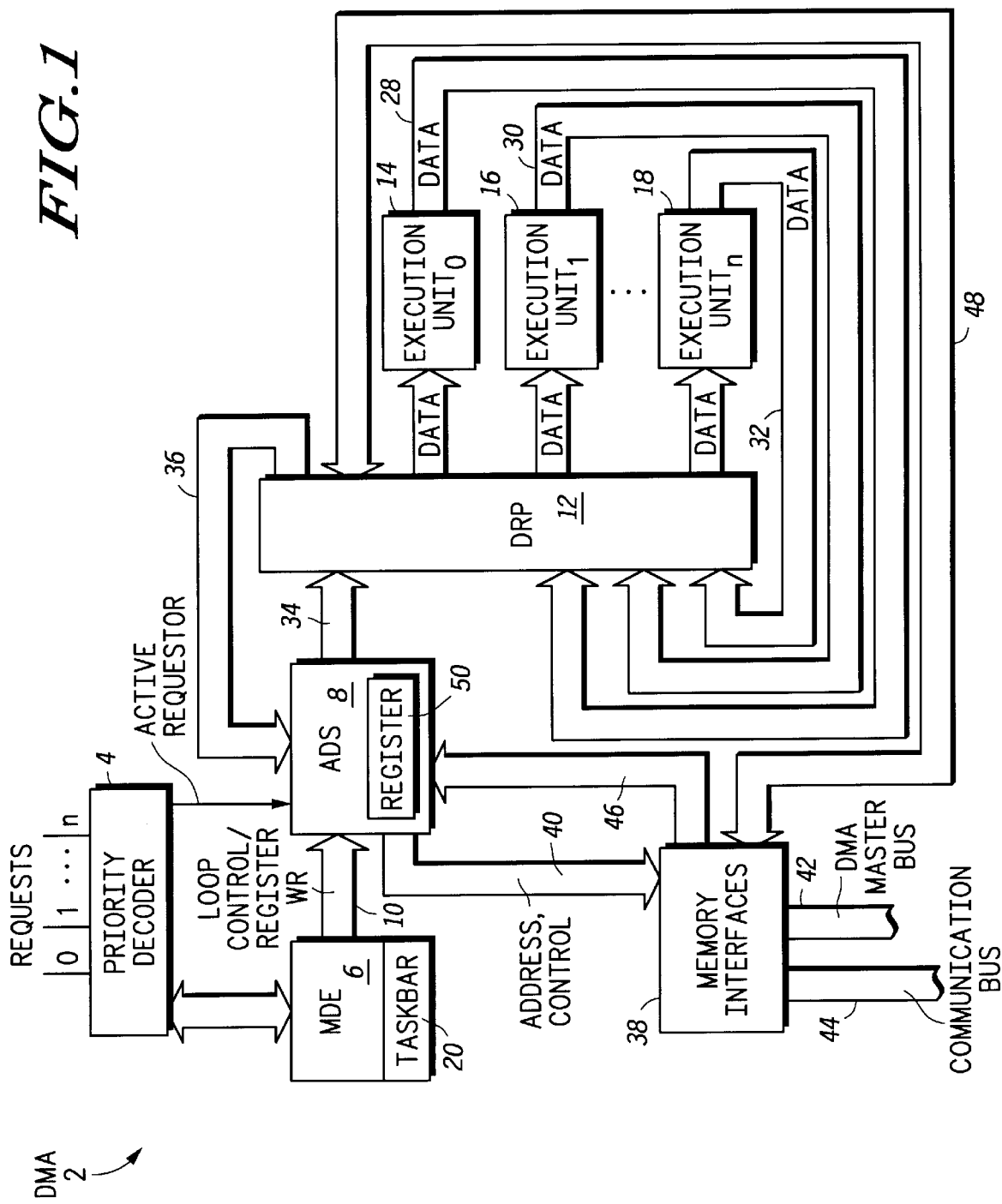
FIG. 1 illustrates, in block diagram form, a DMA controller in accordance with one embodiment of the present invention.

For clarity the terms assertion and negation are used herein to avoid confusion regarding "active-low" and "active-high" signals. The term assert or assertion is used to indicate that a signal is active or true, independent of whether that level is represented by a high or a low voltage. The term negate or negation is used to indicate that a signal is inactive or false.

In one aspect of the present invention, in a data processing system having a processor, a memory and a direct memory access controller, the direct memory access controller having a plurality of execution units, the direct memory access controller adapted to directly execute FOR tasks assigned by the processor, said task comprising a movement of a data element from a first location in said memory to a second location in said memory, each of the FOR tasks described by a loop control descriptor and a data routing descriptor, a method for controlling the direct memory access controller includes the steps of saving context information for a task, and restoring the context information for the task.

The step of saving context information further includes the steps of storing a loop nest pointer value from a loop nest pointer register to a first memory location, the loop nest pointer value corresponding to a last loop control descriptor at a predetermined nest level; storing a current pointer value from a current pointer register to a second memory location, the current pointer value corresponding to a next data routing descriptor to be executed on restoration of the task, and storing context information to a third memory location. The step of restoring the context information for the task includes the steps of determining if the at least one execution unit context information has changed, if the at least one execution unit context information has changed, writing the stored context information from the third memory location to at least one register in the at least one execution unit, writing the stored loop nest pointer value from the first memory location to the loop nest pointer register, and writing the stored current pointer value from the second memory location to the current pointer register.

In another aspect of the present invention, a data processing system includes a processor, a memory and a direct memory access controller, the direct memory access controller adapted to directly execute FOR tasks assigned by the processor, said task comprising a movement of a data element from a first location in said memory to a second location in said memory, each of the FOR tasks described by at least one loop control descriptor. The direct memory access controller including a first in first out queue for pipelining interpretation and fetching of loop control descriptors, wherein loop control descriptors are stored sequentially in the queue according to occurrence in a FOR task, and a pointer identifying a next location in the queue for storing a next loop control descriptor.

In still another aspect of the present invention, a data processing system includes a processor, a memory and a direct memory access controller, the direct memory access controller adapted to directly execute FOR tasks assigned by the processor, said task comprising a movement of a data element from a first location in said memory to a second location in said memory, each of the FOR tasks described by at least one loop control descriptor and at least one data flow representation of a loop body. The direct memory access controller includes a top-loading cache having a plurality of entries, the cache for storing data flow representations, nest level information corresponding to the data flow representations, address offset information for the data flow representations, and a pointer identifying a next location in the cache for storing a next data flow representations.

The present invention will be described with reference to the Figures. FIG. 1 illustrates a DMA according to one embodiment of the present invention. In contrast to the prior art DMA methods, the present invention provides a DMA unit, i.e. DMA controller, that controls data transfers and other operations using a high-level programming language construct. In one embodiment, the DMA unit uses C-language constructs, and specifically FOR loop constructs. The DMA unit is a user-programmable engine that interprets a series of C language FOR loop style descriptors to perform a user configurable series of data movements and manipulations. A collection of these descriptors is much like a software program. There are two types of descriptors: Loop Control Descriptors (LCDs) and Data Routing Descriptors (DRDs). These descriptors form a C language FOR loop programming for the DMA. This adds to the flexibility of prior art DMA units by off-loading compute resources from the processor, while increasing the ease of use for the programmer. Additionally, this improves performance as the FOR loop may be performed by highly optimized, dedicated purpose DMA state machines. The DMA architecture is optimized for very high throughput over complete processing generality, the result being that it typically functions under the command of a processor.

Descriptors include LCDs and DRDs. The LCDs specify the loop index variables, such as memory pointers, byte counters, etc. along with the termination and increment values, while the DRDs specify the nature of the loop body, i.e. how data gets pumped to and from memory and how execution units manipulate data as it is moved. Inner loops may initialize and compare their loop-index variable(s) to outer loops variable(s), allowing the DMA to perform a variety of useful functions. Further, the DMA looping structure allows it to perform indirections and additions in a loop's loop-index initialization, adding flexibility to the available functions. The DMA also supports nested looping within this programming model.

As an example, a DMA program, listed as a sequence of LCDs and DRDs, is as follows:

| LCD1 | for(i=0; i<3; i++) { |
| LCD2 | for (j=0; j<i; j++) |
| DRD2 | *j = *i; |
| DRD1 | *i = 5; |
| | } |

Each line in the DMA program above represents a successive memory location, 32-bit, occupied by the indicated LCD or DRD.

In this example, LCD 1 provides the initialization value, termination condition, and step size for a FOR loop. The variable i is initialized to zero (0) and the loop continues iterations while i is less than three (3). On each iteration, the variable i is incremented. Nested inside this outer FOR loop is a FOR loop with another loop index variable, j, which is initialized to zero (0) and is incremented on each iteration of this inner loop. The DRD information is the body of the loop. On each inner-loop iteration, variable i is used as a memory address of data that is to be moved to the memory location addressed by the variable j.

Similarly, on each outer-loop iteration, variable i holds the address of the memory location into which a value of five (5) is to be written. This example illustrates the use of LCDs and DRDs as building blocks to construct programs or algorithms within the DMA controller.

The DRDs are descriptors that describe assignment statements within the body of the loop in terms of data flow and manipulation. For example, data in the body of the loop may be multiplied together, in which case the DRD will specify data flow through a multiplier for this operation. Similarly, if a logical operation, such as an AND, is indicated, the DRD will specify a data flow through a logic unit for completing this operation. The body of the loop may include a number of levels and combinations of these type functions.

Using the C language constructs and structures, the present invention allows simple encoding of a broad range of applications, including but not limited to simple peripheral to memory transfers, simple memory to memory transfers, simple one-dimensional processing of data, functions of two or more variables, filtering algorithms, such as finite impulse response (FIR), and infinite impulse response (IIR), and also scatter-gather processing via the indirection capability. Additional processing available includes but is not limited to sample format conversion, data decompression, bit-block transfers, color conversion, as well as drawing characters. Note that program model memory regions may exist in any memory-mapped space within the data processing system.

To better understand the utilization of programming constructs to implement such applications, it is desirable to define a few terms. According to the present invention, a "descriptor" is a piece of information, typically a predetermined number of bits, that describes a portion of an algorithm, or location of data, or information relating to any other function to be performed within the DMA. This is in contrast to prior art descriptors that were used to indicate memory locations for data movement, but did not include descriptive information necessary to execute an algorithm. A "task" as used throughout this description is a collection of LCD and DRD descriptors that embodies a desired function. A task could include the steps of gathering an ethernet frame, performing some function on the data content, and storing the result in memory. Additionally, the task could complete by interrupting the processor. The DMA supports multiple enabled tasks simultaneously.

A "task table" is a region in memory that contains pointers to each of the DMA program model components on a per-task basis. A register within the DMA, referred to as a "TASKBAR" or task table base address register, gives the location of the task table itself. The entries in the task table define task begin and end pointers, its variable table pointer and other task-specific information. Alternate embodiments may include a subset of this information or may include additional information. The task table points to the tasks in a "task descriptor table," that is a task-specific region in memory containing descriptors that specify the sequence of events for each task. Each task has its own private variable table. Alternate embodiments may store the LCDs and DRDs in an alternate arrangement or using an alternate storage means.

FIG. 1 illustrates the DMA 2, where connections to the I/O devices are indicated as REQUESTS 0, 1, through n. The DMA 2 includes a priority decoder 4 that communicates with a master DMA engine (MDE 6) and an address and data sequencer (ADS 8). The MDE is coupled to the ADS by way of a loop control/register write bus 10. The DMA 2 also includes a data routing pool (DRP 12) coupled to a plurality of execution units, including $EU_0$ 14, $EU_1$ 16, through $EU_n$ 18. The priority decoder 4 provides an active requestor to the ADS 8.

A task is started by setting predetermined enable bit(s) within the DMA 2, in response to which the DMA 2 accesses the memory locations where descriptor and task information is stored. The set enable bit(s) indicate a task number corresponding to a task to be performed. Note that in the present embodiment, multiple tasks may be identified by the set bit(s), where each of the multiple tasks is enabled. The DMA 2 first reads a register in the MDE 6, labeled as TASKBAR 20, that provides information relating to an origin location within a task table stored in memory. Note that the TASKBAR register may be located in another functional block, where the information is accessible by the MDE 6. The MDE 6 calculates the origin location in the task table. The task table stores multiple task-specific pointers to at least one task descriptor table. In one embodiment, the pointers include task descriptor start and end pointers, a variable table pointer, a function descriptor base address, configuration bit(s), status information, base address for context save space, and literal-initialization LCD base information.

The task descriptor table stores algorithmic descriptors, which are used to implement a user-programmable algorithm. In one embodiment, the algorithm is written in C-language constructs, and each task is composed of at least one FOR loop. Each FOR loop is made up of at least one loop control descriptor (LCD) and at least one data routing descriptor (DRD). The DRD defines the body of the loop, while the LCD provides the initialization value(s), the increment(s), and the termination condition(s) for the FOR loop.

The DMA 2 retrieves the task information from the task descriptor table corresponding to the task identified by the enable bit(s). The DMA 2 then parses the task information. Parsing involves retrieving LCD and DRD information from the Task Description Table, reading the first loop, decoding at least a portion of the C-encoded LCDs and DRDs stored in the task information, and determining a requester. The parsing is performed within the MDE 6 and provides the decoded information to the ADS 8. The decoded information then initializes loop index, termination, and increment registers within the ADS 8. The parsed task information identifies a requester, and the MDE 6 waits to receive a request from that requestor before instructing the ADS 8 to begin processing. Operation of the ADS 8 and the MDE 6 are further detailed hereinbelow.

Continuing with FIG. 1, one embodiment of the invention allows for dynamic request selection. Here, multiple requests are provided to the priority decoder 4 from multiple I/O devices. The priority decoder 4 selects from among the inputs. The initiator/task registers determine which task to parse and process based on the selected requester, where the selection is made according to information contained within the DRDs of the active task.

The priority decoder 4 selects a highest priority requestor for processing based on a priority table. The selection is made of those requesters that are currently making a request to DMA 2. The priority table allows for a predetermined number of priority levels. The priority decoder 4 includes registers that define associated task number and the priority of each request unit. The priority decoder 4 provides handshake signals in response to request inputs. The priority decoder 4 allows programming of each task for external request, priority of request, auto-start of task, interrupts, etc. In alternate embodiments, priority may be based on schemes such as round robin, time sliced, first in, fixed, last in, etc.

An association is made from a requestor to a specific task number, in the present embodiment numbers 0 to 15. The specific task is executed until the initiator removes the request. Note that while a task is executing, a higher priority requestor may interrupt the task. Interruptions occur at loop iteration boundaries.

Upon receiving a request from the priority decoder 4, the ADS 8 reads data according to the order specified in the DRD retrieved from memory. Note that data may be retrieved from an EU, an internal loop register, or a memory read. If the data is routed to an EU, the data is run through a predetermined data path in the DRP 12 according to descriptor information. As illustrated in FIG. 1, data flows from the DRP 12 to the appropriate one or more of the execution units. Each of the execution units has a specific assigned function for a given DRD. In this way, they are configurable and may be user programmed by changing the information in the DRD. This adds flexibility to the DMA 2 by providing a means of implementing any combination of these functions. From the execution unit, manipulated data flows to the DRP 12 for further routing to another of the execution units or to memory or to an internal loop register via the ADS 8.

As discussed hereinabove, the DRDs provide information relating to the body of the loop in terms of data flow and manipulation. If the DRD specifies that two terms are to be multiplied together and then the result is to be logically ANDed with another term, the ADS 8 will first route data through the DRP 12 to the particular execution unit that performs the multiplication. The output of the execution unit is provided via a data bus back to the DRP 12. The ADS 8 then directs data via the DRP 12 to the execution unit that performs the AND operation. The result of this execution unit is then provided back to the DRP 12, which routes the result to the ADS 8. The result is then stored in the memory or to loop register as specified in the body of the loop. To facilitate this data flow, each execution unit, EU0 14, EU1 16, through EUn 18 is coupled to and receives data from the DRP 12 via data bus 22, data bus 24, through data bus 26 respectively. Similarly, each execution unit, EU0 14, EU1

16, through EUn 18 is coupled to and provides data to the DRP 12 via data bus 28, data bus 30, through data bus 32 respectively.

The present invention presents a data flow-through execution unit, where the function of the execution unit is assigned and then data is pumped through it. This saves processing time and adds to the flexibility of data processing.

The ADS 8 provides information to the DRP 12 via bus 34, and receives information from the DRP 12 via bus 36. The ADS 8 provides address control information to a memory interface unit 38 via bus 40. In one embodiment of the present invention memory interface unit 38 contains multiple busses to a single memory. The memory interface unit 38 is bidirectionally coupled to the DMA master bus 42 and the communication bus 44. The memory interface unit 38 is bidirectionally coupled to ADS 8 via bus 46. The ADS 8 reads data from and writes data to the memory interface unit 38 via bus 46. The memory interface unit 38 provides information directly to the DRP 12 via bus 48. Similarly, the DRP 12 provides information to memory interface unit 38 via bus 48. In an alternate embodiment, memory interface unit 38 includes multiple memories. Alternate embodiments may include multiple busses within the DMA 2, for example, bus 48 may include a bus dedicated to a particular EU, where the ADS 8 designates the source of an operand for that EU.

The ADS 8 also includes register(s) 50 for writing control information for each task. The ADS 8 is basically the engine that pumps data through the DMA 2. Based on configuration bits set by the MDE 6 per the application program, the ADS 8 performs as many operands as required and optionally routes them to the execution units. The ADS 8 evaluates termination conditions and stores the result in memory or elsewhere. The ADS 8 may store results internally in loop-index registers. Similarly, results may be provided to an EU as operands. Operation of the ADS 8 is controlled by a state machine, as is operation of the MDE 6.

In one embodiment of the present invention, DMA 2 combines the advantages of cache memory storage and line buffer storage for efficient movement and manipulation of data. Buffers are provided within memory interface unit 3 8 of DMA 2. In this way, communications via the communication bus 44 use the buffers to mask read and write latency associated with other parts of a data processing system, such as latency of the communication bus 44 or a host master bus providing accesses to most system resources. The buffers are used in a similar manner using a cache. Input signals are provided via the communication bus 44 to modify the cache-like behavior of the buffers. While typical buffers are simple registers for temporary storage of data prior to transfer to another location, in this embodiment, the buffers of the memory interface unit 38 are able to retain the data for extended periods of time, even allowing bus transactions to complete out of order. The buffers include write buffers that allow DMA 2 to post writes to the communication bus 44, thus insulating DMA operation from the latency of write operations. This is similar to a posted write buffer.

In this embodiment, the buffers are available for write collection, combining many small write transactions into a few large transfers to conserve bandwidth of the the communication bus 44. In this case, the entire line containing the requested data is fetched. There are also buffers available for read pre-buffering and several buffers may be retained, where the buffers contain recently requested data. Similar to a cache, this takes advantage of temporal locality. Additionally, this enhances the prefetching operations, as recently requested data remains available.

Figure 4:
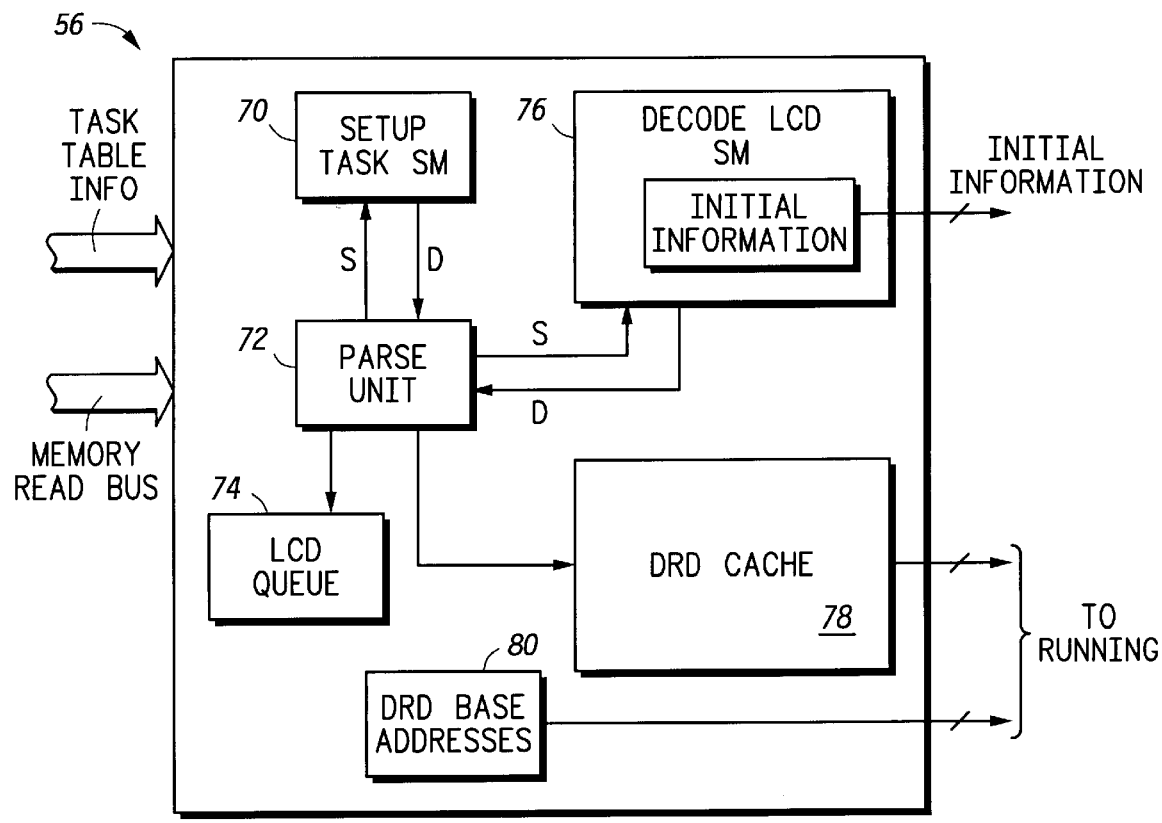
FIG. 4 illustrates, in block diagram and logical diagram form, the operation of a MDE as in FIG. 2 having a first in first out (FIFO) queue for storing loop control descriptors (LCDS) in accordance with one embodiment of the present invention.

To modify the behavior of the buffers, input signals are provided via the communication bus 44, including "FLUSH" signal, indicating all information is to be output from the buffer. In response to the FLUSH signal, the write line buffers are marked to be written out, or flushed The ability to write out all data in the buffers is advantageous, for example, at the end of a task. The flushing of data may be used to ensure that all of the data is written out to memory as soon as possible before communicating the completion of the task to a host processor. Another signal, the "ATTRIBUTE" signal, is used to indicate the ability to use the cache-like behavior of the buffers on this transaction. A read transaction that is not able use the cache-like behavior will fetch exactly the data requested, and will not attempt to pre-read other data. A write transaction that is not able to use the cache-like behavior will be posted, but will be marked for immediate completion. The ATTRIBUTE signal adds flexibility to transactions, where cache compatible and non-compatible transactions are allowed using the same DMA 2. For example, as illustrated in FIG. 4, MDE 6 includes DRD cache 78. The data to be stored in the DRD cache 78 may be cached only once, by having the buffers within memory interface unit 38 treat this data transfer as a non-cacheable. This avoids the information being cached twice. Other examples of non-cacheable transactions include writes that are to be performed immediately, such as writing to an isolated register or memory location, or writing to update a communication semaphore. Writing to an isolated register or memory location is useful in interprocess communication within a data processing system, debug operations, as well as communicating with peripherals.

As the DMA 2 recognizes LCDs and DRDs, as well as other features of the algorithm structure, the DMA 2 is able to recognize cacheable events and non-cacheable events, and is able to control non-cachable events in an event by event manner. The DMA 2 further may use task-based information to control the cache-like behavior of the buffers. As with some microprocessors' memory read buffers, the buffers are able to cache a few bytes following a requested address, anticipating that those bytes will be used in the near future. Although those few additional bytes often are needed, reading the bytes takes unnecessary extra time, if the data should prove not to be needed. The present invention provides for knowledge of incremented amounts and can control cacheability optimally. For example, if the increment for the memory access is 1 byte then there is a clear advantage to read a few bytes ahead. If, however, the increment is 1000 bytes, then the data a few bytes after the requested data will not be used, and therefore cacheability is disabled, thus not spending the time to read the extra unnecessary bytes. When switching to another task, buffered information for the previous task is rarely used by the next task. Although the previous task's information will automatically be flushed out to memory when the next task tries to utilize the buffers, doing so slows that task own. Flushing the buffers as a direct response to a task switch prevents this latency.

Figure 2:
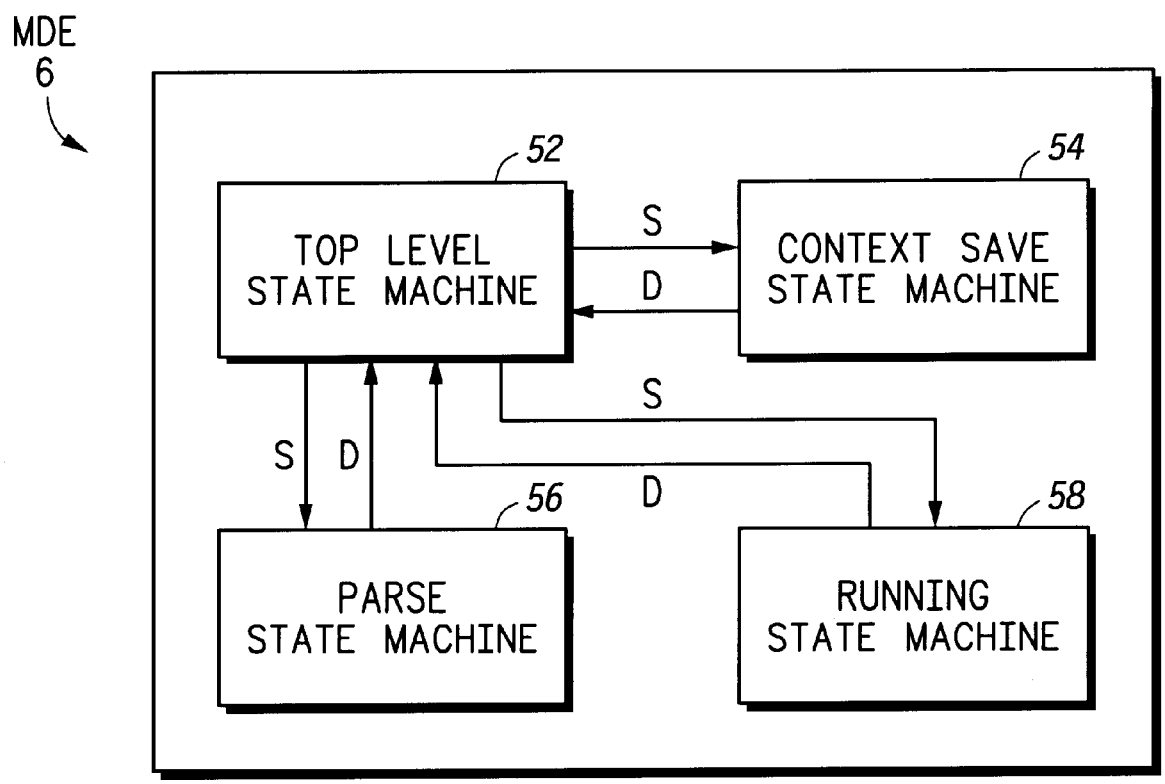
FIG. 2 illustrates, in block diagram form, a master DMA engine (MDE) as in the DMA controller of FIG. 1 in accordance with one embodiment of the present invention.
Figure 3:
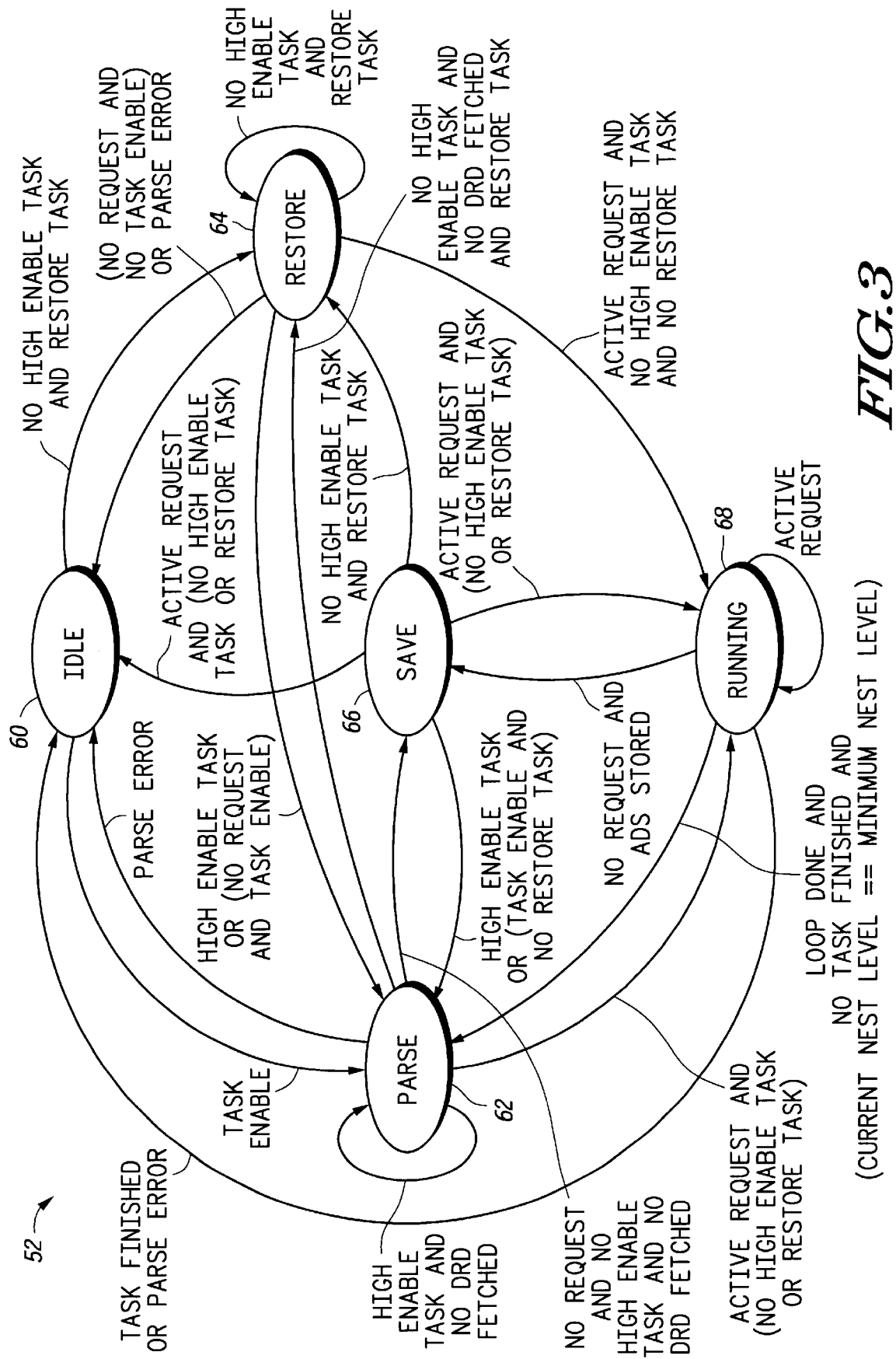
FIG. 3 illustrates, in state diagram form, operation of an MDE as in FIG. 2 in accordance with one embodiment of the present invention.

FIG. 2 further details the state machines that operate MDE 6, including a top level state machine 52, a context save state machine 54, a parse state machine 56, and a running state machine 58. The top level state machine 52 controls the operation of the other state machines, providing state information to each machine and receiving an indication of completion in return. Note that the parse state machine 56 includes a sub state machine for restoring context information. The top level state machine 52 is detailed in FIG. 2, including five states. In this illustration a start signal is indicated by an "S," and a done signal is indicated by a "D." The top level state machine 52 coordinates the other state machines via the S and D signals. When moving to a new state, as illustrated in FIG. 3, the top level state machine 52 issues an S signal to the appropriate state machine and waits to receive the corresponding D signal.

When in the idle state 60, no tasks are processing in the MDE 6. When a task is enabled and the MDE 6 determines that the request may be processed, the MDE 6 parses the requested task. The top level state machine 52 then transitions from the idle state 60 to the parse state 62 where the constituent LCD(s) and DRD(s) of the task are retrieved and the necessary information parsed. Similarly when a request is made to restore a task and no higher priority tasks are enabled, the top level state machine 52 transitions from the idle state 60 to the restore state 64.

The parse state 62 corresponds to the parse state machine 56 of FIG. 2. From the parse state 62 if the requestor for the task being parsed is negated, the top level state machine 52 transitions operation to the save state 66, where the context information for the task is retained pending continuation or cancellation at a later time. If a high task enable is asserted, and there is no fetched DRD, processing remains in the parse state 62. Note that if high task enable is asserted, processing switches to parse a new task. When parsing is completed and the requestor is asserted at the time parsing is completed, the top level state machine 52 transitions to the running state 68. On a parse error the top level state machine 52 transitions to the idle state 60 to await further control. If a request is received to restore a task and no higher priority task is enabled the top level state machine 52 transitions to the restore state 64. This is the case if no DRD is fetched. The restore state 64 is detailed with respect to the parse state machine 56 in FIG. 4.

The running state 68 corresponds to the running state machine 58 of FIG. 2. While the task request remains active, processing remains in the running state 68. If the request for the task currently running is negated, the top level state machine 52 transitions to the save state 66, where the context information for the task is retained pending later action. Within each nest level, when a loop completes before the task completes, the top level state machine 52 transitions back to the parse state 62 to continue parsing other loops if necessary. When the DRD cache is not sufficient to hold information for all nest levels of a task, execution continues as far as possible. At this point, if the nest level of the current loop is not a minimum nest level, processing remains at the running state 68. When the task is completed, or if a parsing error is detected, the top level state machine 52 transitions to the idle state 60 to await further control.

The save state 66 corresponds to the context save state machine 54 and is responsible for retaining context information about the current task that will allow the task to continue processing in the future. From the save state 66, if there is an active request for a task and no higher priority task is enabled as well as no active request to restore a task, the top level state machine 52 transitions to the running state 68. If a request to restore a task is received and no higher priority task is enabled, the top level state machine 52 transitions to the restore state 64. If a task is enabled, including a high priority task, with no request to restore a task, the top level state machine 52 transitions to the parse state 62. Once the context save is complete, if there is no active request for a task, including a high priority request, and no request to restore a task, the top level state machine 52 transitions to idle state 60 to await further control. The save state 66 is detailed with respect to the context save state machine 54 in FIG. 5.

The restore state 64 uses the context information to return the DMA 2, and specifically the MDE 6, to the condition just prior to interruption of the task. Additionally, the ADS 8, and EU(s) may be returned to their condition prior to interruption of the task. From the restore state 64, an active request for a task without a higher priority request or a restore task request transitions the top level state machine 52 to the running state 68. If a task is enabled, including high priority tasks, the top level state machine 52 transitions to the parse state 62. Processing within the restore state 64 continues while the restore request is active and no higher priority tasks are enabled. When the request to restore is negated, and no task is enabled, the top level state machine 52 transitions to the to idle state 60 to await further control. In this case there is no parse error.

FIG. 4 illustrates a portion of the MDE 6 with respect to operation of the parse state machine 56 of FIG. 2. Task table information is provided to the parse state machine 56 from the top level state machine 52. This information includes task pointers, control information, location of the variable table, and other information describing the task. The parse state machine 56 includes several state machines which act in coordination to parse the task. A set-up task state machine 70 is used initialize the task by receiving the task table information, the first descriptor of the task, and any context that may have previously been saved. The parse unit 72 is coupled to the set-up task state machine 70, and stores LCD information to the LCD queue 74 and provides the LCD to the decode unit 76. Fetched LCDs are stored in the LCD queue 74. The LCD queue 74 stores a predetermined number of LCDs and discards them as they are decoded. In one embodiment, the LCD queue 74 is a FIFO queue. The decode unit 76 decodes the LCD into usable information components and generates initial information for the top level state machine 52. The parse unit 72 provided DRD information to the DRD cache 78. The DRD cache 78 stores the nest level, an address offset, and the DRD. The address offset helps to identify the corresponding DRD in the task descriptor table. For a given task, the DRDs are stored in the DRD cache 78 until it is full. At that point, the ADS 8 runs up to the last stored DRD. The parse state machine 56 then parses the next DRDs. When there is room for the remaining DRDs, they are stored in the DRD cache 78, replacing the executed DRDs from the top of the DRD cache 78.

As an example, for a task defined by the following code:

LCD1 {
  DRD1a
  LCD2 {
    DRD2a
    DRD2b
    DRD2c
    LCD3 {
      DRD3a
      DRD3b
      DRD3c
    }
    DRD2d
  }
}
DRD1b
DRD1c

}an initial cache entry is given as:

| Valid Bit | Nest Level [2:0] | Address Offset | DRD [31:0] |
|---|---|---|---|
| 1 | 001 | 0000004 | DRD1a |
| 1 | 010 | 000000c | DRD2a |
| 1 | 010 | 0000010 | DRD2b |
| 1 | 010 | 0000014 | DRD2c |
| 1 | 011 | 000001c | DRD3a |
| 1 | 011 | 0000020 | DRD3b |
| 1 | 011 | 0000024 | DRD3c |
| 1 | 010 | 0000028 | DRD2d | where the DRD cache 78 is full, but DRD1*b* and DRD1*c* have not been stored. The cache is filled at the end of the second loop, starting at LCD2. The ADS 8 is instructed to run down to the second loop. Note that the MDE 6 does not decode the DRDs but provides them directly to the ADS 8.

After the first two DRDs are executed, the parse state machine 56 stores the next two parsed DRDs to the DRD cache 78, as illustrated below:

| Valid Bit | Nest Level [2:0] | Address Offset | DRD [31:0] |
|---|---|---|---|
| 1 | 001 | 000002c | DRD1b |
| 1 | 001 | 0000030 | DRD1c |
| 1 | 010 | 0000010 | DRD2b |
| 1 | 010 | 0000014 | DRD2c |
| 1 | 011 | 000001c | DRD3a |
| 1 | 011 | 0000020 | DRD3b |
| 1 | 011 | 0000024 | DRD3c |
| 1 | 010 | 0000028 | DRD2d |

Note that only the first two entries in the cache have changed, the other entries remain in their location, and continue to be executed in order.

The MDE 6 of the present invention provides efficiency to the DMA 2 by allowing execution of several nested FOR loops without the need to fetch more code, i.e. descriptors. The MDE 6 may parse several loops while retaining necessary DRD information in a DRD cache 78. The DRD cache 78 stores a predetermined number of longwords. In the illustrated embodiment, the DRD cache 78 stores eight longwords.

The MDE 6 fills the DRD cache 78 in order starting from the top in a top-loading scheme. Alternate embodiments may incorporate a memory array for the DRD cache 78. If a task requires more DRDs than will fit in the cache, the MDE 6 uses the top-loading scheme, but does not need to remove data from the structure, with the exception of setting the valid bits on starting a new task.

One embodiment of the present invention provides a method of reducing the area required for storing the DRD addresses using two 26-bit base addresses and eight 7-bit offsets each corresponding to a DRD in the DRD cache 78. The least significant bit of the base address is also the most significant bit of the offset. This shared bit serves as the indicator between the two base address registers. If the bit is a "0" the address is in a first range, and if the bit is a "1" the address is in a second range. This reduces the area necessary to store the DRD addresses, as the eight 32-bit addresses would otherwise be used to retain the addresses for context saving/restoring.

Figure 5:
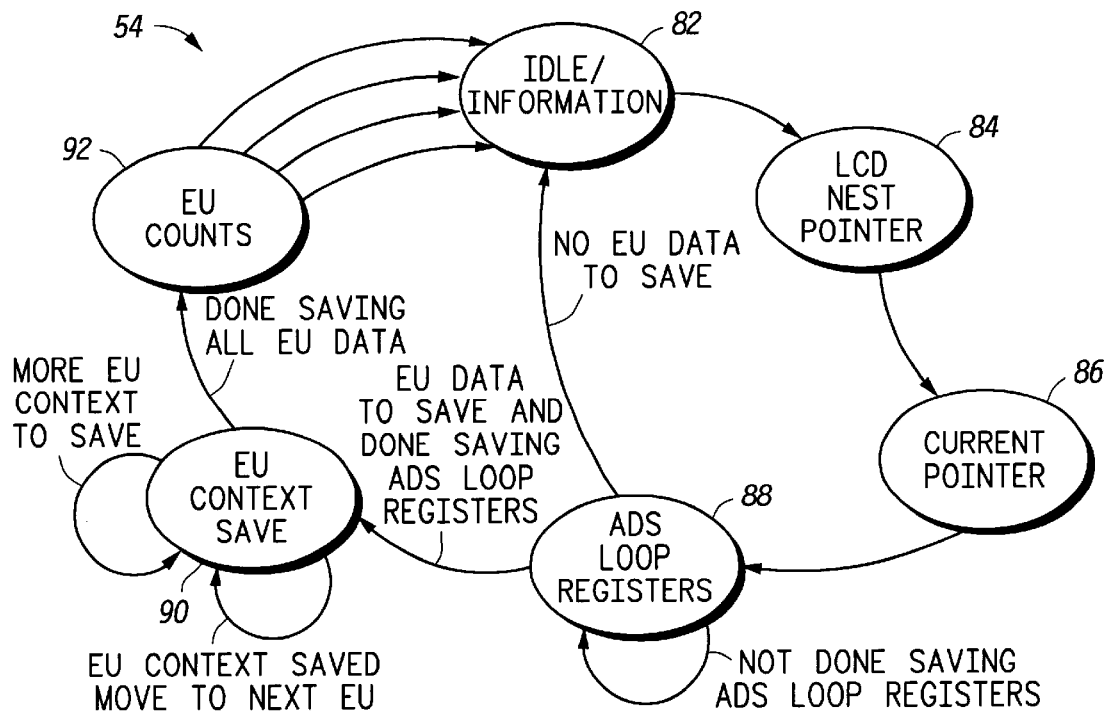
FIG. 5 illustrates, in state diagram form, operation of a context save state machine as in FIG. 2 in accordance with one embodiment of the present invention.

Continuing with FIG. 4, the parse state machine 56 also includes an address unit 80, which stores the DRD base addresses. The address unit 80 and the DRD cache 78 output information to the running state machine 58 of FIG. 2. FIG. 5 illustrates the context save state machine 54 having six states. A context save operation saves the pointer(s) to the LCD(s) and DRD(s), the ADS loop register, as well as EU information for this portion of the task. When a task is interrupted, it is only necessary to save the loop information that is at or below the last DRD at nesting level 1. An idle/information state 82 generates the information to be saved that details what other information is saved in this context save space. In response to a request to save the context, the context save state machine 54 transitions from the idle/information state 82 to store the LCD nest pointer in state 84. Once this information is stored, the context save state machine 54 transitions to store the current pointer in state 86, and then to state 88 to store the ADS loop registers. From the ADS loop register save of state 88, if there is no EU context to save, the process transitions to the idle/information state 82. Processing remains in state 88 until all loop registers are saved and then transitions to the EU context save of state 90 if there is any EU context to save. If multiple EUs are associated with the loop, processing remains at state 90 until the context for all associated EUs is saved. When all of the associated EU context is saved processing transitions to state 92 for EU counts. At state 92, the number of saved longwords for each EU is written out as well. This aids in restoring context information in that if an EU does not need the data restored, the EU counts data indicates how many longwords can be skipped in memory. If no EUs are used for this task, there is no need to save the EU count data. After saving the longword, the context save state machine 54 transitions back to idle. Each task has a context save pointer in the task table. The pointer identifies the base address at which the task context may be saved. The descriptors stored in the LCD FIFO and the DRD cache are lost on a context save, but when the context is restored the descriptors are fetched from the task descriptor table.

According to one embodiment of the present invention, initial information register(s) work in conjunction with the DRD cache. Alternate embodiments may implement other memory storage units, such as a cache, etc. The initial information registers are located within the MDE's parse state machine 56, and contain information relating to initialization of loop index registers in the ADS. The initial information registers include multiple fields, corresponding to each loop index register. The ADS determines the necessary conditions for a given loop based on the information stored in this register. Without the initial information register (s), the MDE would refetch all of the variables used to initialize the ADS loop index registers and thus defeat the purpose of having a DRD cache to allow the ADS to autonomously run over several nested loops when possible. The initial information register(s) store only a part of each LCD, rather than the entire LCD, avoiding the refetching of variables each time a loop in entered again. Similarly, the DRD cache avoid the refetching of DRDs. In this aspect, the DRD cache provides efficiency in conjunction with the initial information registers, allowing the DMA to execute several loops at once without requiring MDE intervention. When MDE intervention is required, such as when the cache is full, it is possible to retain some of the initial dataflow representations in the cache avoiding the need to fetch the DRDs on reentry of loops. This top loading scheme increases performance with a full cache or even when the cache is not full.

In an alternate embodiment, the DMA 2 rapidly parses multilevel nested-loop structures, then executes them without further delay(s) for parsing or any form of instruction interpretation. The loop indices of the outer-most loop are initialized as part of the parsing process, but the indices of the inner-more loops are reinitialized each iteration of the loop enclosing it. The inner-loop initialization may occur very rapidly, and independent of parsing. Loop indices may be initialized to other loop indices, variables, pointers, or to the results of calculations using one or a combination of these. To keep FOR-task execution fast, the loop indices are held in registers within the ADS 8. Variables, however, are not accessed as frequently and are stored in memory. For rapid operation of the repeated inner-loop initialization step, the ADS 8 uses a cache, referred to as a variable cache, for storing relevant variable values. The majority of DMA algorithms require a small proportion of the total number of variables for the purpose of initializing inner-loop indices. In some cases more variables will be needed than will fit in the variable cache, requiring the ADS 8 to read them from memory. Note that these memory reads may introduce a small performance loss when the amount of data the variable cache will store is less than the total number of variables for that task.

According to this embodiment, variables needed for initialization of inner-more loops take priority over variables for outer-more loops for storage in the variable cache. As inner-more loops execute more frequently, they are initialized more frequently. A variable cache miss for initializing an outer-more-loop index reduces overall performance less than for an inner-more loop. The MDE 6 selects the variables to be stored in the variable cache. In response, the ADS 8 subsequently uses them for loop-index initialization. On a variable cache miss, the ADS 8 does not replace an entry in the variable cache. The MDE 6 allocates and replaces entries in the variable cache.

The MDE 6 chooses entries in the variable cache on a most-recently-parsed basis. It parses LCDs from outer-more loops first working toward inner-more loops. The process stops after parsing the LCDs of an inner-more loop, at which time the ADS 8 executes that multi-level looping structure. Because the MDE 6 parses the LCDs of the inner-more loops last, it is beneficial to have those variables needed to initialize the most-recently-parsed loops stored in the variable cache. Therefore, the MDE stores variable values in the variable cache in a circular manner as it parses LCDs. When a variable needed for initializing a loop index is encountered, the MDE 6 writes that variable's value to the next entry in the variable cache. Additionally stored in the variable cache is a tag to identify the variable number. The MDE 6 then increments the pointer into the variable cache. If the pointer increments past the end of the variable cache, it wraps back around to the first entry in the variable cache. The variable cache is fully associative, therefore, no variable value need be placed into any particular entry in the variable cache. In this way the variable cache contains the most recent N variables parsed, where N is the size of the variable cache.

An additional consideration in writing variable values into the variable cache is that a given variable does not appear in more than one place in the variable cache. The MDE 6 takes advantage of the cache-associativity of the variable cache and checks if a given variable is already stored in the variable cache. If the variable is not stored in the variable cache, the MDE 6 allocates or replaces a new cache entry. The replacement algorithm used for allocation or replacement is straightforward and optimized, as DMA 2 architecture inherently operates in terms of nested loops.

In addition to using the variable cache, these inner-more-loop index initialization data movements may be accelerated by performing parallel movements. If, for example, an inner loop has three loop indices, when possible, the DMA 2 initializes all three loop indices from the variable cache and the other loop indices in a single clock cycle. The variable cache is therefore an M-ported cache, M being the number of loop indices allowable for a given loop.

This embodiment of the present invention, increases the efficiency and speed of the DMA 2 by providing a variable cache, where entries are prioritized for inner-most loops. Parallel data movements further increase the efficiency of the DMA 2.

In yet another embodiment of the present invention, a DRD addressing scheme reduces the area required to store the addresses. In one embodiment, the method only requires two 26-bit base addresses and 7-bit address offsets for each of the eight (8) DRDs in the cache, instead of the full eight 32-bit DRD addresses. This information is used in the context save/restore providing information relating to the correct DRD to use when execution resumes.

The present invention provides a method of context switching avoiding the use of many registers required to switch channels in a virtual DMA. The present invention services higher priority tasks first, and reduces the amount of hardware required for context switching, thus improving the efficiency and overall performance of the DMA.

The present invention avoids the expense of duplicating circuitry that allows processing of multiple tasks by providing a single DMA to operate as one of a variety of processing units. Each processing context is requested by the resources the DMAC services. The context information is stored in memory, and therefore the size of the context information is reduced, as is the frequency of storing context information.

Additionally, the LCD queue of one embodiment of the present invention provides efficiency in parsing, allowing pipelining of the descriptor parsing.

In alternate embodiments of the present invention, a DMA may be provided without EU(s). In one embodiment, the DMA without EU(s) acts as a "scatter/gather" DMA. This DMA relates to packetized data-communications protocols. It is very desirable to have each packet "scattered" to a different block of memory. For example, under IP (internet protocol) each packet is allowed to take a different route through the network, causing them to arrive at the destination in a quasirandom sequence. By putting each in a different buffer in memory they may easily be reordered to a sequential order by simply moving the pointers to the buffers according to sequence numbers in the packets. The opposite process of "gathering" these correctly sequenced packets to transmit data works essentially the same, but with data moving in the opposite direction. A scatter/gather DMA requires a 2-level nested loop, the outer loop sequencing through buffers, and the inner loop sequencing through each byte of the buffer chosen by the outer loop. This process though does not require any data manipulation.

Those skilled in the art will recognize that modifications and variations can be made without departing from the spirit of the invention. Therefore, it is intended that this invention encompass all such variations and modifications as fall within the scope of the appended claims.

What is claimed is:

1. In a data processing system having a processor, a memory and a direct memory access controller, the direct memory access controller having a plurality of execution units, the direct memory access controller adapted to directly execute FOR tasks assigned by the processor, method for controlling the direct memory access controller, comprising the steps of:

saving context information for a task, comprising:
    storing a loop nest pointer value from a loop nest pointer register to a first memory location, the loop nest pointer value corresponding to a last loop control descriptor at a predetermined nest level;

storing a current pointer value from a current pointer register to a second memory location, the current pointer value corresponding to a next data routing descriptor to be executed on restoration of the task; and storing context information for at least one execution unit to a third memory location; and restoring the context information for the task, comprising:

determining if the at least one execution unit context information has changed;

if the at least one execution unit context information has changed, writing the stored context information from the third memory location to at least one register in the at least one execution unit;

writing the stored loop nest pointer value from the first memory location to the loop nest pointer register; and writing the stored current pointer value from the second memory location to the current pointer register.

2. The method as in claim 1, further comprising the steps of:

executing a FOR task having a first loop; and storing a first set of variable values for variables associated with initialization of the first loop in a cache.

3. The method as in claim 2, wherein the FOR task comprises a second loop, the method further comprising the step of:

storing a second set of variable values for variables associated with initialization of the second loop in the cache.

4. In a data processing system having a processor, a memory and a direct memory access controller, the direct memory access controller adapted to directly execute FOR tasks assigned by the processor, said task comprising a movement of a data element from a first location in said memory to a second location in said memory, each of the FOR tasks, the direct memory access controller comprising:

a first in first out queue for pipelining interpretation and fetching of loop control descriptors, wherein loop control descriptors are stored sequentially in the queue according to occurrence in a FOR task; and a pointer identifying a next location in the queue for storing a next loop control descriptor.

5. The direct memory access controller of claim 4, further comprising:

a cache for storing data routing descriptors, wherein the data routing descriptors are stored according to a top-loading scheme.

6. The direct memory access controller of claim 5, further comprising:

a base address register storing base addresses corresponding to the data routing descriptors, wherein each entry in the base address register stores a portion of the address, and wherein each entry in the base address register includes a boundary identification bit to identify the address.

7. The data processing system of claim 4, wherein the direct memory access controller further comprises a variable cache, the variable cache having a plurality of entries for storing variable values, the variable values being used to initialize FOR-task loop index variables.

8. The data processing system of claim 7, wherein the variable cache is fully associative.

9. The data processing system of claim 7, wherein the plurality of entries of the variable cache are allocated and replaced sequentially.

10. The data processing system of claim 7, wherein each value stored in the variable cache is unique.

11. The data processing system of claim 7, wherein a first portion of the plurality of entries of the variable cache are read in parallel, wherein the first portion of the plurality of entries stores variables to initialize loop indices associated with a first FOR-task loop.

12. In a data processing system having a processor, a memory and a direct memory access controller, the direct memory access controller adapted to directly execute FOR tasks assigned by the processor, said task comprising a movement of a data element from a first location in said memory to a second location in said memory, each of the FOR tasks described by at least one loop control descriptor and at least one data flow representation of a loop body, the direct memory access controller comprising:

a top-loading cache having a plurality of entries, the cache for storing data flow representations of FOR task bodies, nest level information corresponding to the data flow representations, address offset information for the data flow representations; and a pointer identifying a next location in the cache for storing a next data flow representations and corresponding valid bits.

13. The direct memory access controller of claim 12, wherein the address offset information stored in the cache includes a base address select bit, the direct memory access controller further comprising:

a first base address register selected when the base address select bit is a first value; and a second base address register selected when the base address select bit is a second value;

wherein the selected one of the first and second base address registers combined with the address offset information identifies a storage location of each data flow representation.

14. The direct memory access controller of claim 12, further comprising:

a first in first out queue for pipelining interpretation and fetching of loop control descriptors, wherein loop control descriptors are stored sequentially in the queue according to occurrence in a FOR task; and a pointer identifying a next location in the queue for storing a next loop control descriptor.

15. The direct memory access controller of claim 12, further comprising: a memory interface unit having a plurality of buffers, the memory interface unit adapted to receive control signals via a communication bus;

wherein a first one of the control signals identifies a transaction as a cacheable transaction.

16. The direct memory access controller of claim 15, wherein in response to the first one of the control signals identifying a first transaction as a cacheable transaction, the buffers cache data; and wherein in response to a the first one of the control signals identifying a second transaction as a non-cacheable transaction, the buffers store data individually.

17. The direct memory access controller of claim 15, wherein in response to a second of the control signals, at least a portion of the plurality of buffers are marked to write out data.

18. The direct memory access controller of claim 12, further comprising:

a memory interface unit having a plurality of buffers, wherein the FOR tasks information is utilized to control the plurality of buffers.

* * * * *